US006818828B2

(12) United States Patent
    Quaggia

(10) Patent No.: US 6,818,828 B2
(45) Date of Patent: Nov. 16, 2004

(54) DRY TERMINATION FOR AN ELECTRIC CABLE

(75) Inventor: Dario Quaggia, Cinisello B. (IT)

(73) Assignee: Pirelli Cavi E Sistemi S.p.A., Milan (IT)

( * ) Notice: Subject to any disclaimer, the term of this patent is extended or adjusted under 35 U.S.C. 154(b) by 0 days.

(21) Appl. No.: 09/983,371

(22) Filed: Oct. 24, 2001

(65) Prior Publication Data

US 2002/0056564 A1 May 16, 2002

Related U.S. Application Data

(63) Continuation of application No. 09/402,584, filed as application No. PCT/EP98/02063 on Apr. 9, 1998.

(30) Foreign Application Priority Data

Apr. 10, 1997 (IT) .......................................... MI97A0817

(51) Int. Cl.[7] ............................................. H02G 15/02
(52) U.S. Cl. ................................... 174/74 R; 174/73.1
(58) Field of Search ........................... 174/74 R, 75 D, 174/85, 89, 84 R, 88 C, 115, 78, 73.1

(56) References Cited

U.S. PATENT DOCUMENTS

| 1,878,169 A | * | 9/1932 | Myer |
| 2,368,923 A | | 2/1945 | Hampton |
| 2,386,185 A | | 10/1945 | Beaver et al. |

(List continued on next page.)

FOREIGN PATENT DOCUMENTS

| DE | WO 90/13933 | * | 11/1990 | .......... H02G/15/184 |
| DE | WO 96/10851 A | * | 4/1996 | ............ H01R/13/53 |
| DE | WO 97/09762 | * | 3/1997 | ........... H02G/15/02 |
| DE | WO 97/31417 | * | 8/1997 | ........... H02G/15/06 |
| EP | 0667665 A | * | 8/1995 | ......... H02G/15/068 |
| EP | WO 97/314417 A | * | 8/1997 | ........... H02G/15/06 |
| IT | WO 86/02210 | * | 4/1986 | ......... H02G/15/184 |
| IT | 0 667 665 A | * | 9/1995 | ........... H02G/15/68 |
| IT | 0 683 555 A | * | 11/1995 | ........... H02G/15/68 |
| US | WO 91/16564 | * | 10/1991 | ............. F16L/11/00 |

OTHER PUBLICATIONS

JW Weatherley et al , IEEE Article, "Heat Shrinkable Terminations for 66kV Polymeric Cables", Nov. 1986, Raychem Ltd, UK, pp. 238–241.*

"New Prefabricated Accessories for 66–154kV Crosslinked Polyethylene Cables," IEEE Conference Record, 1974 Underground Transmission and Distribution Conference, pp. 224–232, Mitsugu Saito & Kazuyoshi Inaoka (Apr. 1–5, 1974).

"Heat–Shrinkable Terminations for 66kV Polymeric Cables," IEE Second International Conference on Power Cables and Accessories 10kV–180kV, pp. 238–241, J.W. Weatherley, R.A. John, & M.H. Parry (Nov. 26–28, 1986).

Primary Examiner—William H. Mayo, III
(74) Attorney, Agent, or Firm—Finnegan, Henderson, Farabow, Garrett, & Dunner, L.L.P.

(57) ABSTRACT

A termination for an electric cable includes a conductive element, a conductive shank, an insulating body, a casing of insulating material, and electric field control means. The conductive element is not part of the electric cable. The conductive shank connects to an upper extremity of the conductive element and is adapted for connection of the termination to an electric installation. The insulating body includes a substantially-cylindrical portion surrounding a lower extremity of the conductive element and adapted for connection of the termination to the electric cable. The conductive element and the insulating body constitute a substantially-rigid assembly adapted to resist a predetermined transverse stress. The termination also includes a joining assembly having an electric connection element connecting a conductor of the electric cable and the conductive element of the termination, and a flexible joint covering the electric connection element and a length of the cylindrical portion of the insulating body.

39 Claims, 8 Drawing Sheets

U.S. PATENT DOCUMENTS

| | | | |
|---|---|---|---|
| 2,552,414 A | | 5/1951 | Eriksen et al. |
| 2,791,622 A | | 5/1957 | Nicholas |
| 3,036,148 A | | 5/1962 | Swerdlow |
| 3,198,877 A | | 8/1965 | Olson et al. |
| 3,290,428 A | * | 12/1966 | Yonkers .................. 174/73 |
| 3,539,706 A | * | 11/1970 | Buroni et al. ............. 174/75 |
| 3,622,688 A | * | 11/1971 | Link et al. ............... 174/142 |
| 3,663,928 A | | 5/1972 | Keto et al. |
| 3,737,556 A | * | 6/1973 | Cunningham ............ 174/19 |
| 3,761,602 A | * | 9/1973 | De Sio et al. ........... 174/73.1 |
| 3,784,729 A | | 1/1974 | Davis et al. |
| 3,876,820 A | * | 4/1975 | Mashikian ............... 174/19 |
| 3,878,313 A | | 4/1975 | Varner et al. |
| 3,920,307 A | | 11/1975 | Burns |
| 4,497,975 A | * | 2/1985 | Selsing .................... 174/19 |
| 4,677,255 A | * | 6/1987 | Cumley ................... 174/138 F |
| 4,757,159 A | * | 7/1988 | Dejean .................... 174/73.1 |
| 4,791,245 A | * | 12/1988 | Thornley ................. 174/73.1 |
| 5,130,495 A | | 7/1992 | Thompson |
| 5,206,780 A | | 4/1993 | Varreng |
| 5,210,676 A | | 5/1993 | Mashikian |
| 5,280,136 A | | 1/1994 | Yaworski et al. |
| 6,074,229 A | | 6/2000 | Johansson |
| 6,333,462 B1 | | 12/2001 | Quaggia |

\* cited by examiner

DRY TERMINATION FOR AN ELECTRIC CABLE

This application is a continuation of U.S. patent application Ser. No. 09/402,584, filed Feb. 9, 2000 (now U.S. Pat. No. 6,333,462) which is a national stage entry under 35 U.S.C. § 371 from International Application No. PCT/EP98/02063, filed Apr. 9, 1998, in the European Patent Office; additionally, Applicant claims the right of priority under 35 U.S.C. § 119(a)–(d) based on patent application No. MI97A000817, filed Apr. 10, 1997, in the Italian Patent Office; the contents of all of which are relied upon and incorporated herein by reference.

BACKGROUND OF THE INVENTION

1. Field of the Invention

The present invention relates to a termination for an electric cable, for medium and high voltages, of the type for outdoor use, exposed to air and possible polluting agents, complete in all its parts before being transported to installation place and suitable for connection to the electric cable without accessing into the inside thereof.

2. Description of the Related Art

For the purposes of the present invention, with medium and high voltages it is generally meant voltages in a range of from 10 kV to 245 kV and more.

For the purposes of the present invention, the term "termination for an electric cable" means a device suitable to connect an electric cable to a bare conductor, such as, for example, an overhead conductor. This termination comprises electrical connecting means between the cable conductor and the bare conductor, and electrical separation means between the outer surface of the cable and parts connected thereto, generally at ground potential, and the elements under tension, such as the bare conductor. A termination of this kind generally comprises a conductive element, an insulating coating, and field control means able to produce an electric field configuration compatible with dielectric strength features of the relevant elements.

A known termination for outdoor use is described in the publication "New Prefabricated Accessories for 64–154 kV Crosslinked Polyethylene Cables" (Underground Transmission and Distribution Conference, 1974, pages 224–232).

The termination comprises a supporting base for an outer insulating casing made of porcelain and provided with a finned surface. The electric cable devoid of its shield extends over the whole length of the termination up to the upper extremity where it is fastened to be supported by the casing and where connection occurs to a voltage shank and therefrom to another electric installation.

A cylinder made of an epoxy resin incorporating a ground electrode is assembled about the elastomer element and is fastened to the supporting base. The cylinder has a conical shape matching that of the cone-shaped element inside it.

The installation further comprises the use of a spring system acting on the lower end of the elastomer element so that a pressure between such element and the cable insulation takes place and also between the element and the epoxy resin cylinder, so as to avoid the presence of air traces and thus the risk of electrical discharges.

The space inside the porcelain casing is filled with insulating oil.

The termination, due to the presence of a porcelain casing, is of the self-bearing type and rests on a base being part of a pylon or the like.

Also known are terminations provided with a solid insulator of the overhead type instead of resting on a supporting structure. According to this solution the termination is associated with the structure by interposition of an insulating element.

For example, from publication "IEEE Power Cables and Accessories 10 kV–180 kV", London, November 1986, pages 238–241, it is known a 66 kV voltage termination for an electric cable which is extended over the whole length of the termination.

In this solution, starting from one cable end the semiconductive shield is removed over a certain length thereof and the shield end is coated with a conductive paint until an insulator portion is covered.

On the area where the shield is cut off, heat-shrinkable tubes of given impedance due to the presence of capacitive and resistive elements are applied, which tubes capacitively associated with the cable conductor reduce electrical stresses in the area where the shield is cut off.

An additional shrinkable tube is then disposed about the innermost tubes of same type and about the cable insulator portion.

The outermost tube comprises an insulating profile close to the cutting-off end of the cable shield.

A plurality of fins of heat-shrinkable insulating material is then fitted on the outer tube.

For installation of the termination qualified workers skilled in heat-shrinking technique are required and accuracy, attention to details and cleanliness in all steps are needed.

Patent WO 91/16564, in its part describing the state of the art, mentions terminations made, as the previous one, according to heat-shrinkage technique, and explains how to avoid that technique by making use of a suitable mandrel on which a jacket of elastomer material provided with finnings is expanded; the jacket is contracted by slipping off the mandrel onto a previously prepared electric cable of smaller diameter.

The final cable portion to be enclosed within the termination comprises the cable conductor, followed at a certain distance by the insulator devoid of a semiconductive layer and the shield.

A tubular winding is part of the cable assembling, made of a material formulated so as to reduce stresses otherwise present at the end of the semiconductive layer; this winding is applied on the semiconductive layer and the insulator.

Alternatively, provision may be made for a layer intended for reducing said stresses within the inner insulating jacket, by coextrusion or rolling for example.

The upper end of the conductor is associated with a flat clamp provided with a hole.

To make slipping the mandrel off easier, a plurality of ribs may be provided on which the elastomer jacket rests, and also the use of a lubricant between the ribs.

The mandrel is disposed with its elastomer jacket about the cable end portion already arranged to be part of the termination. The jacket twisting on the mandrel facilitates the lubricant spreading on the ribs and the mandrel slipping off, thereby causing contraction of the jacket on the cable end portion.

Also known are terminations for electric cables in which the electric cable is inserted only partially into the termination instead of extending up to the shank connecting to the overhead line or other electric installation.

One example of such self-bearing termination is described in patent application EP 95 101 33 82 of the Applicant itself.

In this solution, the electric cable is stopped at a given point from the termination entrance and the electric connection over the whole length which is required to reach the overhead line is accomplished by means of a conductive element.

The conductive element is externally provided with a finned elastomer layer and is supported by an insulating base preferably made of an epoxy resin resting on a supporting element.

The assembly consisting of the epoxy resin base and the conductive element makes the termination of the self-bearing type.

In particular, the assembly consisting of the epoxy resin base and the rigid conductive element brings the electric field to the termination surface to a value compatible with the dielectric strength of air and is long enough to form a leak line adapted to resist discharges.

The electric cable, at a given distance from the termination entry, is deprived of the shield, leaving the insulator uncovered. At the shield cutoff, electric field control means are provided which consist of a deflecting cone and an upper insulator useful for giving rise to electric field values compatible with the electrical strength of the employed materials and the surrounding air.

The epoxy resin base comprises a cone-shaped cavity on which the end portion of the insulator of the field control means rests.

A suitable spring arrangement pushes the cone and the insulator over it against the cone-shaped surface of the resin base in such a manner that no incorporation of air bubbles may occur between the contact surfaces of the different parts, which as known may bring about risks of electrical discharges.

WO 97/09762 discloses a cable termination for a high-voltage cable insulated by a solid insulating material which is used to connect the cable with an insulated conductor. With a particular arrangement of electrical couplings and field-control elements between the cable conductor and the insulated conductor, this device allows a rapid and leakage-free installation. This device forms a closed current path without the risk of flashover. This device is primarily (even though not exclusively) designed for connecting solid-insulated cables with gas-insulated devices. In particular, in FIG. 2 a connection between a solid-insulated cable and a gas-insulated insulator for outdoor use is illustrated.

SUMMARY OF THE INVENTION

The Applicant has noted that, by arranging a cable termination completed in all its parts before being mounted into its support and location of use, and by subsequently carrying out the operations of connection to the cable, installation operations can be substantially simplified and reliability of the operating assembly increased. Such connection to the cable operations employ connection, junction, or lapping techniques falling within the standard technical knowledge of the installation user, generally an electric energy supplying company or the like.

Within the scope of the present invention it has been found, in particular, that a termination having a portion substantially of the same size as the cable for which the termination is intended allows ready connection, by means of known techniques, of the termination to the cable. In this way, all assembly operations and technical tests on the termination could be carried out at the factory, in a controlled environment and by a qualified staff, without requiring performance of these operations in the field or by the customer.

In a first aspect, the invention relates to a termination assembly for an electric cable, comprising:
- a termination having a conductive element and an insulating covering extended over it and
- means for connection to an electric cable, characterized in that
- said termination comprises a connecting portion comprising a conductor and an insulating covering coaxial thereto, having a substantially cylindrical configuration and predetermined lengths and diameters, and
- said connecting means comprise a joining assembly which connects said connecting portion of the termination with one end of said electric cable, wherein said predetermined lengths and diameters are compatible with said joining assembly.

In a preferred embodiment, said insulating covering of the termination comprises an insulating body having means for connection with an outer supporting structure.

In particular, said connecting portion of said termination comprises an end portion of said conductive element and said insulating body.

Preferably, said joining assembly connecting said connecting portion of the termination and one end of said electric cable comprises an electric connection element and a prefabricated flexible joint. The electric connection element joins a conductor of said electric cable and said conductive element of said termination. The prefabricated flexible joint covers said electric connection element and a portion of said connecting portion of the termination and of said end of said electric cable.

In another aspect, the present invention relates to a termination for an electric cable of predetermined diameter, comprising:
- a conductive element longitudinally extended between one lower extremity and one upper extremity,
- a conductive shank connected to said upper extremity of said conductive element, adapted to connect the termination to an electric installation,
- an insulating body surrounding said conductive element,
- a casing of insulating material about said insulating body,
- field control means included in said casing, characterized in that said conductive element comprises a substantially cylindrical portion including said lower extremity, and said insulating body comprises a portion surrounding said lower extremity of the conductive element, having an outer cylindrical surface coaxial with said substantially cylindrical portion of said conductive element.

In particular, said insulating body comprises a conductive coating extended over a predetermined length of said portion surrounding the lower extremity of the conductive element, suitable to constitute an electric shield about the conductive element itself.

Preferably, said field control means are in contact with said conductive coating of the insulating body.

In a preferred embodiment said field control means comprise a field deflecting element of semiconductive elastomeric material.

Preferably, said conductive coating on the insulating body comprises a paint layer filled with conductive fillers.

Preferably, said insulating body comprises means for connection to an outer supporting structure.

In particular, said connecting means comprise a flange transverse to the longitudinal axis of the termination comprising a supporting surface for the terminal to the supporting structure.

Preferably, in an aspect of the present invention, said conductive element and said insulating body constitute a substantially rigid assembly, adapted to resist a predetermined transverse stress.

Preferably, said casing of insulating material about said insulating body comprises a portion of elastomeric material adhering to the insulating body or elastically tightened on the insulating body.

Preferably said casing of insulating material comprises an outer part provided with a finned surface; preferably said outer part with a finned surface consists of a material having environmental resistance.

In a preferred embodiment, said first part of the insulating assembly incorporates a deflecting element elastically pushed along the lower portion of the insulating body in contact with the conductive coating applied to the insulating body forming an electric shield.

In a particular embodiment, said insulating body incorporates a deflecting element in the lower part thereof and said insulating casing is formed of a finned tube elastically and directly fitted on the outer surface of the insulating body.

In a further aspect, the present invention relates to a method of connecting an electric cable, comprising an electric conductor, an insulating covering and a shield disposed about said conductor, to a bare conductor, characterized in that it comprises the steps of:

suitably arranging a termination comprising a conductive element, an insulating body about said conductive element, a casing of insulating material on said insulating body and a conductive shank connected to a first extremity of said conductive element;

arranging a conductive coating adapted to form an electric shield over a predetermined extent of the lower portion of the insulating body, providing electric field control means at an extremity of said conductive coating of said insulating body, and subsequently carrying out a mechanical and electric connection between a second extremity of the conductive element of the termination and the cable conductor, insulating said mechanical and electric connection, connecting the cable shield to said conductive coating of the termination.

Preferably, the method of the invention further comprises the step of mechanically connecting said insulating body to a supporting structure.

Preferably, said steps of insulating said mechanical and electric connection and connecting the cable shield with said conductive coating of the termination comprise applying a joint over the area corresponding to said mechanical and electric connection between a second extremity of the conductive element of the termination and the cable conductor.

In a particular embodiment, said step of arranging a conductive coating adapted to form an electric shield over a predetermined extent of the lower portion of the insulating body comprises applying a semiconductive paint to the insulating body.

Preferably, said electric field control means have at least one portion pressed on the conductive coating of the insulating body.

In a preferred embodiment said casing is elastically fitted about said insulating body.

In particular, in accordance with the method of the invention, said steps of:

suitably arranging a termination comprising a conductive element, an insulating body about said conductive element, a casing of insulating material on said insulating body and a conductive shank connected to a first extremity of said conductive element;

arranging a conductive coating adapted to form an electric shield over a predetermined extent of the lower portion of the insulating body, disposing electric field control means at an extremity of said conductive coating of said insulating body, are carried out at the factory before installation of the termination in the field.

Preferably, the method of the invention further comprises the step of electrically testing said termination carrying said conductive covering and electric field control means at the factory, before installation.

In accordance with a further aspect, the present invention relates to a method of manufacturing a termination for an electric cable characterized by the steps of:

arranging a conductive element linearly extended over a predetermined length, applying an insulating body about the conductive element, externally applying a conductive coating over a predetermined extent to a portion of the insulating body close to one of the extremities of the conductive element, applying electric field control means in electrical contact with said conductive coating, disposing a casing of insulating material having a predetermined surface extension over said insulating body and over said electric field control means, in an area corresponding to the extremity of said conductive element and said electric field control means.

Further features will become more apparent from the detailed description of some preferred embodiments of a termination for an electric cable in accordance with the present invention.

BRIEF DESCRIPTION OF THE DRAWINGS

This description will be given hereinafter with reference to the accompanying drawings, in which.

DETAILED DESCRIPTION THE PREFERRED EMBODIMENTS

Figure 1:
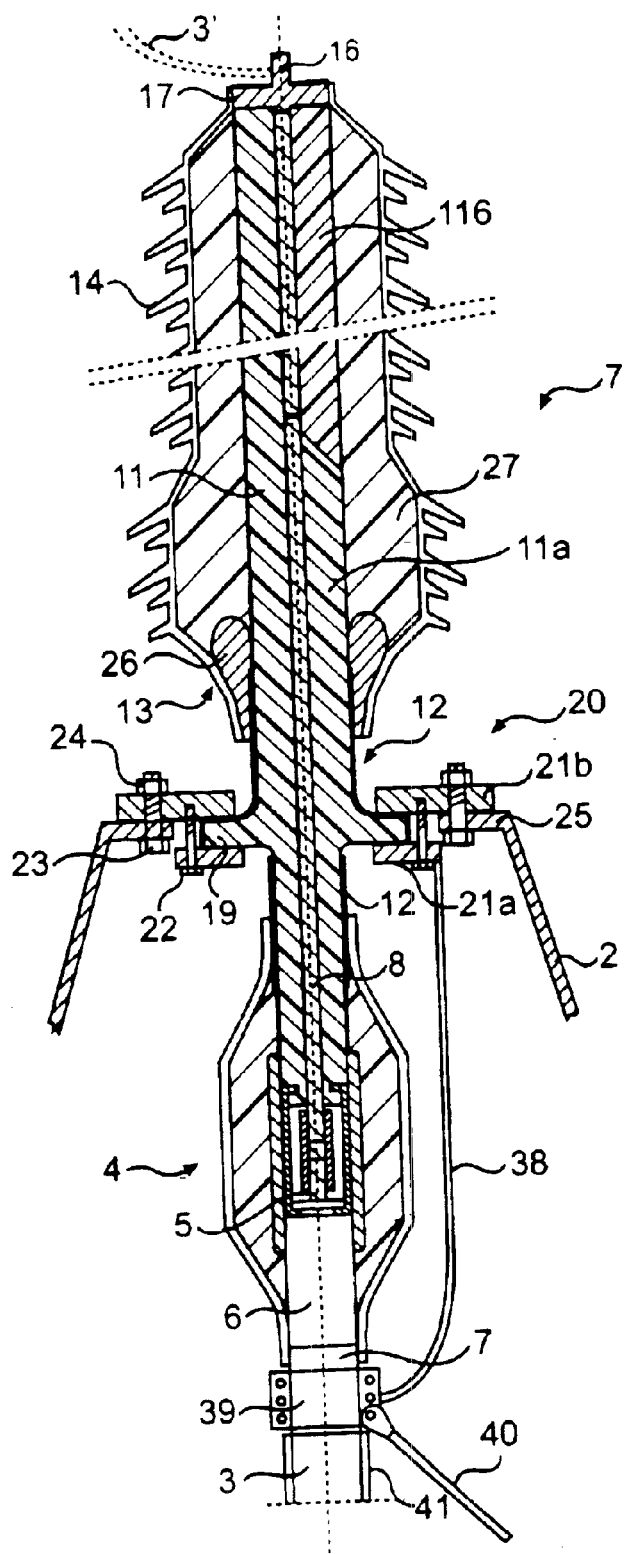
FIG. 1 is a longitudinal sectional view of a termination in accordance with the invention, connected to an electric cable.

An example to carry out the invention is shown FIG. 1, comprising a termination 1 associated with a supporting structure 2, an electric cable 3 and connecting means 4, between cable 3 and termination 1.

The upper end of the termination is connected to an overhead line 3', diagrammatically shown in FIG. 1 by a dashed line.

The electric cable 3, generally for voltages included between 60 and 500 kV (this voltage range being generally designated as "high voltage" in the art) comprises a conductor 5, for instance a copper cord, an extruded insulator 6 and a semiconductive layer 7, stepwise removed in its end portion for connection with joint 4.

Layer 7 forms the shield inside which the electric field lines generated by the conductor 5 voltage are guided.

The electric cable can be of a different type with respect to the exemplified one; for instance, it may have a layered structure, made of paper or paper laminate and polymeric material soaked with oil or insulating mixtures.

Figure 2:
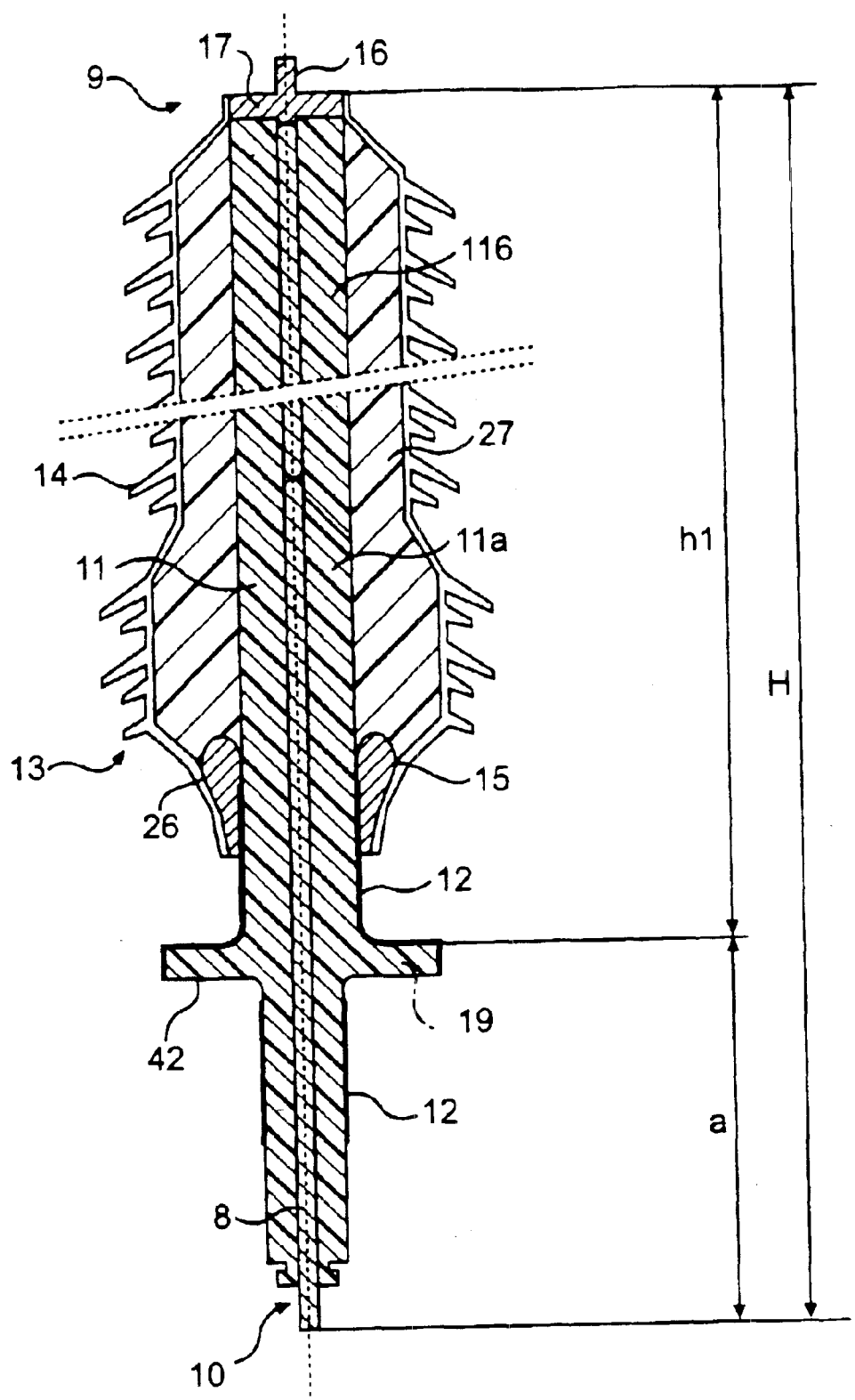
FIG. 2 is a longitudinal sectional view of the termination alone shown in FIG. 1.

Termination 1, better shown in FIG. 2, where it is illustrated separately, complete in all its parts before being associated with supporting structure 2 and electric cable 3, comprises a conductive element 8 extended between the upper and lower ends 9, 10 of the termination; an insulating body 11 adhering to the conductive element; a conductive coating 12 applied over a predetermined extent of the outer lower portion of the insulating body 11; a field control element 13; and a finned casing 14 of insulating material extended from the upper end 9 of the termination, in proximity to the termination portion to be associated with the supporting structure. In the example of FIG. 2, in particular, the finned casing 14 extends up to covering field control element 13 which, in turn, is in contact with the upper edge 15 of the conductive coating 12.

In the following, the expression "conductive element" means either an element completely made of a conductive material, of solid or tubular structure, flexurally rigid, or a flexible conductive element made sufficiently rigid for the purposes of the invention by further elements associated therewith, as shown in the following, or any other equivalent form, such as an element of dielectric material with which a tubular conductive or conductive-made layer is chemically or mechanically associated.

In some preferred embodiments the conductive element is of metal material, such as steel, copper, aluminium or any other metal of good electric conductivity.

By field control element it is herein intended either a suitably traced conductive body, usually designated as electrode or deflector, currently made of a semiconductive elastomeric material, incorporated into a body of insulating material, the whole being designed so as to keep the electric field gradient within acceptable limits, or a material having permittivity and conductivity variable according to the electric gradient, or also a condenser system, designed for the same purpose.

The termination comprises a shank 16 at the upper end which is connected to the conductive element 8 and projects outwardly for connection with the electric overhead line 3'; the shank 16 is surrounded by a shield ring 17 of a size such as to avoid discharges due to "corona effect".

According to a preferred embodiment, the insulating body 11 about the conductive element can be formed of a unitary piece, as shown in the left-hand portion of FIG. 2, for instance made of epoxy resin, optionally comprising fibres or other fillers to increase mechanical strength.

Alternatively, according to an embodiment shown in the right-hand portion of FIG. 2, the insulating body 11 is made, for a first portion 11a, of an epoxy resin, and for the remaining portion 11b of a layer 18 of insulating elastomeric material, for instance EPR, silicone rubber or the like.

Preferably, the unit formed by conductive element 8 and insulating body 11 comprises the supporting elements intended for combining termination 1 with supporting structure 2 shown in FIG. 1.

Figure 3:
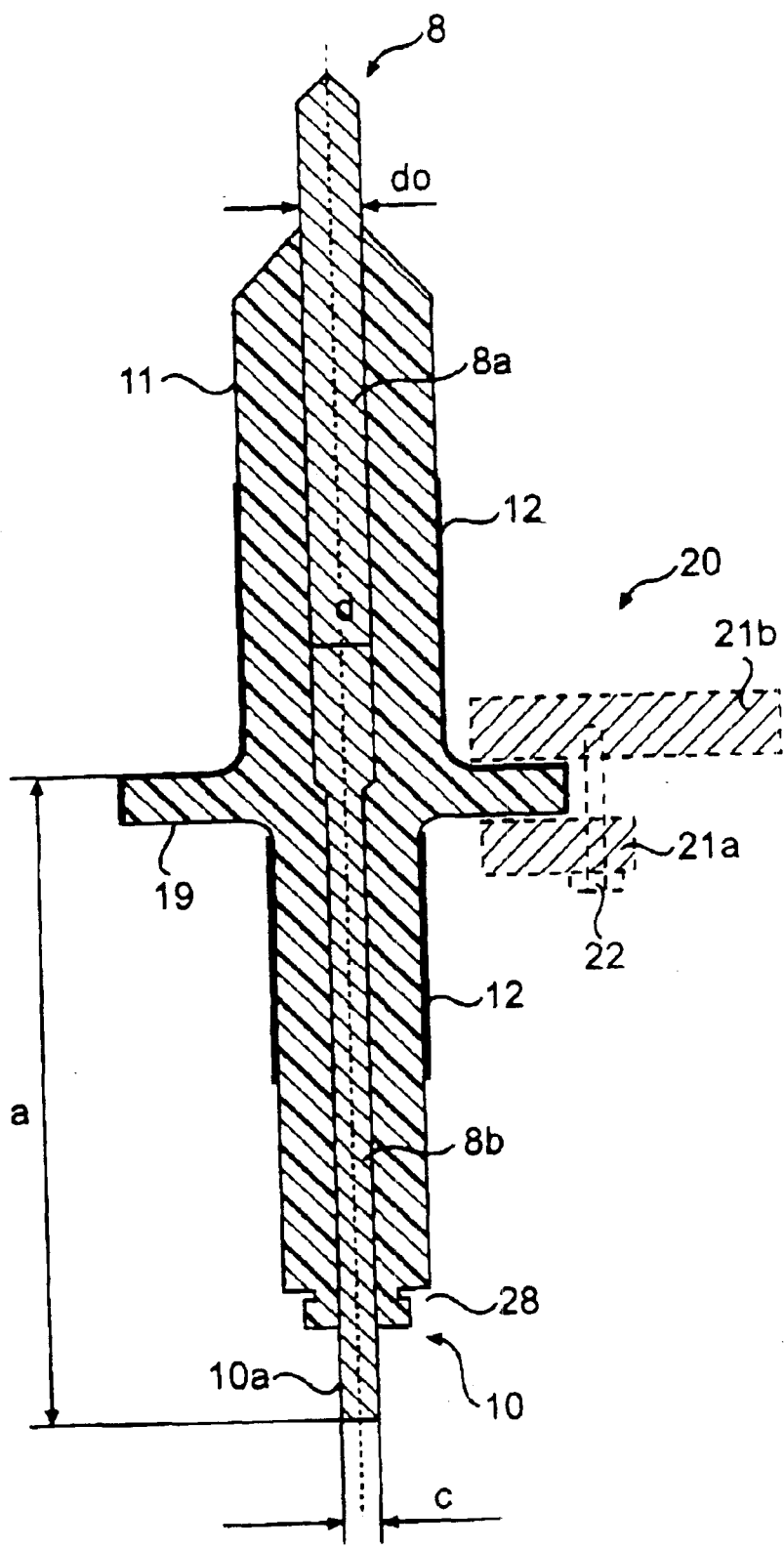
FIG. 3 shows a detail of FIG. 2 in an expanded scale.

As more clearly shown in the expanded view of FIG. 3, said supporting elements are preferably made by casting the insulating body in a single piece comprising a flange 19 placed at a distance of predetermined value "a" from the lower extremity 10 of the termination; for example, for a termination at 170 kV a value "a" of about 500 mm may be appropriate.

In the right-hand portion of FIG. 3, fastening elements 20 for insulating body 11 are partially shown, with dashed lines, which in this example consist of a pair of opposite plates 21a, 21b, pressed at the opposite sides of flange 19 by anchoring tie-rods 22.

Said fastening elements 20 further comprise bolts 23 and nuts 24 to fasten plate 21b to a base 25 of the supporting structure 2, as shown in FIG. 1.

The conductive coating 12 applied to the lower portion of the insulating body is intended to constitute a shield inside which the electric field lines are contained.

Preferably, the conductive coating is obtained by a semiconductive paint applied both to the tubular portions of insulating body 11 downstream and upstream of flange 19 and to the upper surface of the flange itself. In one embodiment, the paint comprises an insulating resin filled with conductive components, for instance, an epoxy resin filled with graphite. Alternatively, a semiconductive taping wound tightly about the insulating body, a heat-shrinkable elastic tube filled with carbon black, an aluminum tube with a horizontal flange, or another equivalent solution adapted to form an electric shield about the conductive element 8 may be provided.

Field control element 13 when the termination is in use is intended for confining the distance of the electric field lines emerging from upper edge 15 of conductive coating 12 to values compatible with the strength of the surrounding air.

According to the preferred embodiment of FIG. 2, the field control element 13 comprises a deflecting body 26, of semiconductive elastomeric material, incorporated into the lower portion of an insulating sleeve 27 covering insulating body 11.

Insulating sleeve 27 is constituted by an insulating elastomeric blend, for instance EPR (elastomer based on an ethylene-propylene copolymer, or an ethylene-propylene-diene terpolymer), devoid of conductive fillers, and deflecting body 26 is constituted by a semiconductive blend, for example an EPR-based blend made conductive by carbon black fillers.

By insulating blend it is herein meant an elastomeric blend having a resistivity substantially not lower than $10^{12}$ $\Omega$cm; by semiconductive blend it is herein meant an elastomeric blend having a resistivity substantially not exceeding $10^4$ $\Omega$cm.

Finned casing 14 is formed of an insulating material, elastically fitted on sleeve 27. Alternatively, sleeve 27 itself may be provided with an outer finned surface, if the constituting material is suitable to the intended use conditions. In this case finned casing 14 forms one portion of sleeve 27.

Finned insulating casing 14 is suitable to resist the surrounding atmosphere, therefore it does not show, during use, the so-called "tracking" phenomenon described in standard IBC 1109, 1992 as an irreversible degradation of the insulating material surface, involving formation of conductive paths even in dry conditions.

According to the embodiment of FIG. 2 the finned insulating casing 14 extends until it covers the lower portion of deflecting cone 26; in other embodiments of the invention the casing could extend in a different manner from that shown in the figure, depending on specific use requirements.

Figure 4:
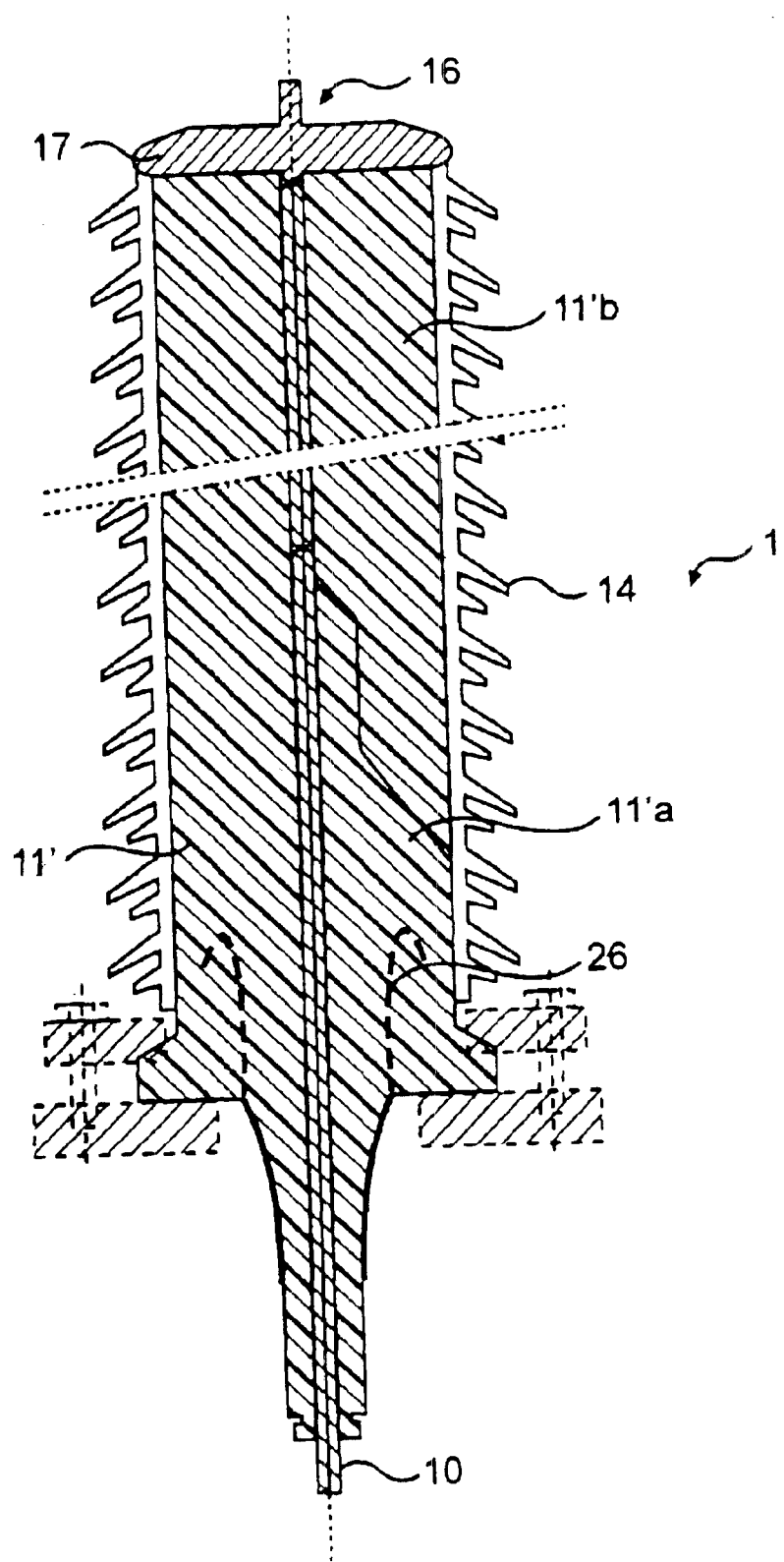
FIG. 4 is a longitudinal sectional view of an alternative embodiment of a detail of the termination of FIG. 1.

FIG. 4 shows a second embodiment of the termination; in this figure parts similar to those of the termination of FIG. 2 are indicated by the same reference numbers.

In the embodiment of termination shown in FIG. 4, insulating body 11' incorporates field deflecting element 26.

Insulating body 11', analogously to what already described for insulating body 11 in the embodiment of FIG. 1, can be formed of a unitary piece, preferably made either of an epoxy resin reinforced with fibres or similar fillers, or of another insulating material, as shown in the left-hand side of FIG. 4; alternatively, as shown in the right-hand side of FIG. 4, it may consist of a lower part 11'a made of an insulating material, for example an epoxy resin, and of an upper part 11'b made of a layer of elastomeric insulating material, for instance EPR.

In both the above solutions a finned insulating casing 14 is present, which is of substantially tubular form, having a low thickness, made of an elastomeric material associated with the inner cylindrical resin surface of the insulating body. Conveniently, this casing, besides giving a sufficiently extended finned surface so as to avoid surface discharge phenomena, offers a protection to the insulating body against weathering agents, such as humidity and the like.

By way of example, with reference to measurements shown in FIG. 2, and correspondingly as regards the embodiment of FIG. 4, for a termination up to 170 kV there is an overall height H between the shank and the lower extremity of about 2500 mm, indicating with H the sum between the already mentioned distance "a" equal to about 500 mm and the distance "h" between shank 16 and the upper surface of flange 19, equal to about 2000 mm.

Value "h" is determined by the requirement of sufficiently spacing apart from each other shank 16 under tension from flange 19 associated with the supporting structure, electrically connected to the earth, in such a manner that the finned surface of casing 14 may give rise to a leak line suitable to avoid electric discharges to earth.

In the described example, the value of the leak line is about 4000 mm.

Value "a" is determined by the requirement of having a sufficient available space under the flange 19 in order to be able to validly carry out an electric or mechanical connection between the termination and the electric cable.

For this purpose, the unit formed by the conductive element and the insulating body is already suitably arranged for a subsequent connection with the electric cable.

In particular, as shown in FIG. 3, conductive element 8 has, in proximity to its lower extremity, a portion 10a not covered by insulating body 11; in turn, insulating body 11 is provided with an annular groove 28, the whole being suitable to allow an easy connection with the cable, as explained in the following.

In the embodiment shown in FIGS. 1 to 3, advantageously the diameter of the cylindrical portion of the insulating body in correspondence with its portion disposed above flange 10, has a value greater than that of the corresponding extension under the flange itself.

Additionally, as shown in FIG. 3, also the diameter of conductive element 8 in correspondence with its part 8a disposed above flange 19, is a value greater than that of the corresponding extension 8b under the flange itself.

In this way, the self-bearing capability of the conductive element is increased, which will result in a greater resistance to forces acting transversely to the termination, and the electric field lines distribute over a larger section of the insulating body.

In the example of FIG. 2, for voltages up to 170 kV, the conductive element is made of aluminum (hardened avional) and has diameter "$d_0$" of 50 mm. The diameter of the insulating body has a value "d" equal to 200 mm. The values of diameter "c" of the lower portion of element 8 and of the corresponding diameter of the extension of the insulating body under flange 19 are determined by the cable size for which the termination is intended and are advantageously equal or similar to the corresponding diameters of the conductor and of the cable insulator to be connected.

Termination 1 of FIGS. 2 and 4 constitutes a complete unit in all its operating parts, irrespective of the electric cable for which it is intended.

Therefore, termination 1 may be manufactured and tested in an independent manner and subsequently transferred to the installation place to be connected to the supporting structure and to the relevant cable.

FIG. 1 shows termination 1 in its installation position on supporting structure 2, its flange 19 being sandwiched between opposite plates 21a, 21b mutually tightened by tie-rods 22, and the upper plate 21b fastened to the base 25 of the structure by a bolt and nut arrangement 23, 24.

The termination is connected to the upper part thereof to the overhead line 3' by shank 16.

The method of connecting the termination to the cable in the most general aspect of the present invention comprises the following fundamental steps:

a) disposing cable 3 externally and at a lower position with respect to termination 1 after removing a portion of insulator 6 from the central conductor 5 end and a portion of shield 7 from said insulator 6;

b) mechanically and electrically connecting the upper extremity of cable conductor 5 to the lower extremity 10 of conductive element 8;

c) connecting cable shield 7 to conductive coating 12 of insulating body 11.

Advantageously, steps a, b, c can be carried out by usual operators skilled in the field of electric cables, thereby avoiding the usual known operations, wherein introduction of the cable into a termination is required partially or over the whole length thereof, with intervention of skilled persons acquainted with the specific features of the termination.

Connection of the cable to the termination, in particular restoring of insulation and shield at the junction area may comprise techniques usually adopted to connect two cable lengths, for instance either by applying tapes or the like or, preferably, by using prefabricated elastic joints, as described in the following as an example and shown in FIG. 1 and in FIG. 5 to an expanded scale.

Joint 4 comprises a terminal 29 for connecting cable conductor 5 and conductive element 8 of the termination together, a metal clip 30, substantially tubular and made of two detachable parts, whose extremities 31, 32 are inserted into groove 28 of insulating body 11 of the termination and into a suitable groove 33 formed in cable insulator 6 respectively; clip 30 aims at avoiding relative movements by effect of heat-shrinkage of the respective materials, as described in more detail in Patent EP 0 199 742.

Terminal 29 and clip 30 are suitably electrically connected by a conductor wire 34, so as to determine an equipotential condition and consequently an absence of electric discharges even in the presence of air.

The joint further comprises a field-deflecting body 35, made of electrically conductive material, a cover 36 made of premoulded insulating material, and a sheath 37 made of semiconductive material, whose ends are respectively in contact with cable shield 7 and semiconductive coating 12 is of insulating body 11.

A copper braiding 37', which is also in electric contact with cable shield 7 and semiconductive coating 12, surrounds the joint to avoid influence of capacitive currents; furthermore, one or more outer sheaths, not shown, cover the assembly.

FIG. 1 further shows grounding elements of the supporting structure 2 of the termination.

These elements comprise a copper plait 38, applied between plate 21a electrically connected to base 25, and a collar 39 tightened on the cable shield 7; a suitable electric cable 40 brings collar 39 to ground potential.

A sheath 41, made of polyethylene or the like, is disposed externally of cable shield 3, having the function of protecting the cable metal shield against corrosion that could take place in case of water penetration.

In the embodiment of FIG. 1, the sheath integrity can be checked, for example as regards the possible presence of holes in the sheath itself.

This check is made by applying electric voltage to the cable metal shield, for example by a hand-held generator, and verifying its insulation relative to the earth. To carry out this test, connections 38 and 40 are temporarily removed, so that shield potential can be raised relatively to the ground potential for a period necessary for the check.

To this purpose, an interruption in the continuity of the semiconductive paint layer 12 is present in correspondence to flange 19, between the lower portion of body 11, on which joint 4 is fitted, and the upper portion of body 11, so as to electrically separate the cable shield that is to be energized from support 2, which is at ground potential.

Termination 1 connected to joint 4 operates as described hereinbelow.

The termination is characterized in that it comprises a cable mock-up inside it, which is formed by the conductive element associated with the insulating body to the lower portion of which, both upstream and downstream of flange 19, the semiconductive paint 12 suitable to form an electric shield is applied.

The electric field lines are included between the maximum potential value of the conductive element and the potential value of the grounded shield (consisting of semiconductive paint 12).

In correspondence with the shield interruption, i.e. in correspondence with upper edge 15 of semiconductive paint layer 12, a transition from an area in which the electric field lines are within insulator 11 and an open area occurs; in this area a density increase in equipotential electric field lines would occur in a radial direction, because said upper shield edge, being corner-shaped, has high values of curvature.

As known, in a termination the value of the electric field gradient in a given area is substantially expressed by the ratio between electric potential at said area and distance between adjacent equipotential lines.

Therefore, in correspondence with the upper edge of the shield an excessive value of the field gradient would be present which will bring about the risk of electric discharges.

In accordance with the embodiment of FIG. 1, said density increase of the electric-field lines is avoided due to the presence of deflecting cone 26 incorporated into insulating sleeve 27.

In the embodiment of FIG. 2, the sleeve 27 is advantageously characterized by a section widening at the lower portion relative to the remaining portion, both for the purpose of enabling incorporation of a deflecting cone 26 of appropriate size and in order to determine a sufficient size so as to cause a mutual radial moving apart between the electric field lines, in order to obtain an electric gradient value at the outer surface which is compatible with the rigidity of the employed materials and the surrounding air.

In the preferential embodiment shown, for voltages up to 170 kV, the diameter corresponding to section widening of sleeve 27 has a value "D" corresponding to 440 mm where the diameter values of the conductive element 8 and insulating body 11 are those previously mentioned.

Figure 6:
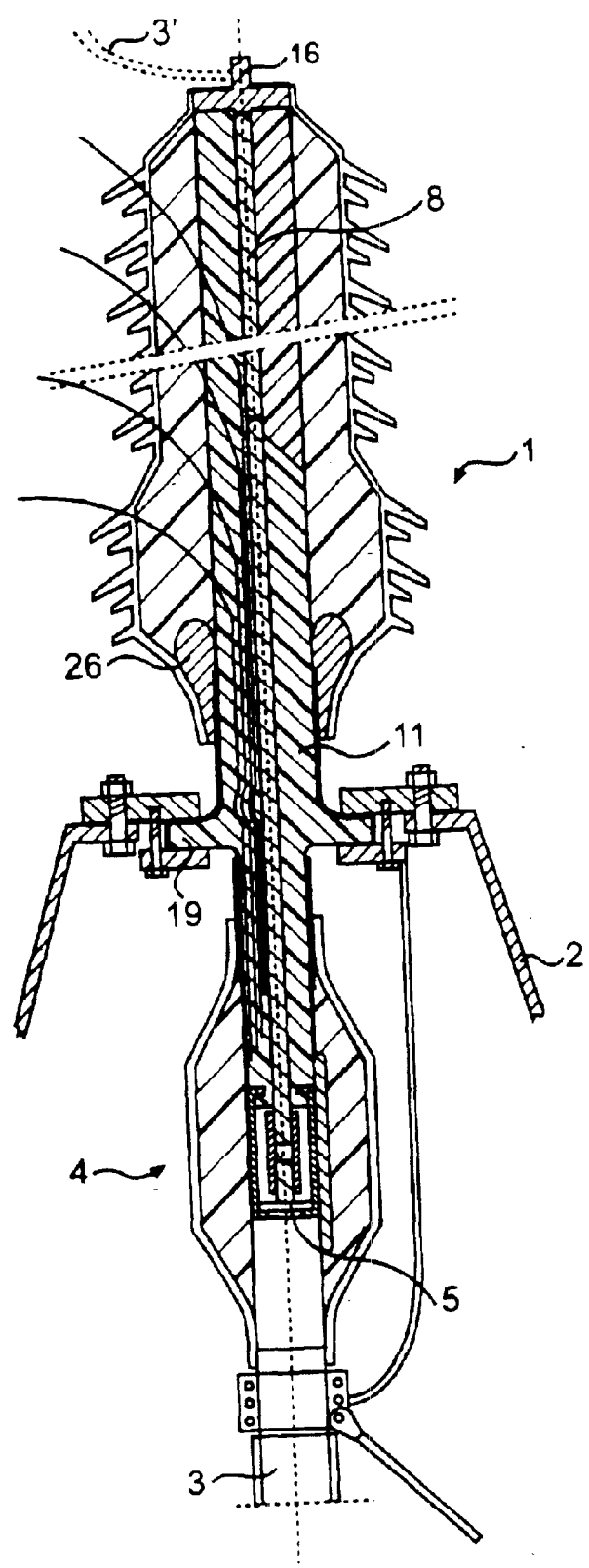
FIG. 6 shows the field line configuration in a portion of the termination of FIG. 1 in use conditions.

By way of example, on the left-hand side of FIG. 6, the course of the electric-field lines is qualitatively shown, as well as the relevant spacing determined by field-control means, adapted to operate at electric strength values in the air lower than 2.5 kV/mm and preferably lower than 2 kV/mm.

A good operation of the termination further depends on the height between shank under tension 16 and flange 19 in contact with the supporting structure at the ground potential.

To this end, the self-bearing features of the termination, determined by its rigid central portion supported through flange 19 on the supporting structure, enable accomplishment of a termination, suitable to operate in an upright position, having a length such as to provide a path in the air long enough so as leak current has a negligible value.

Because of its rigidity to bending the termination can operate without remarkable deformations and in the presence of transversal stresses.

The presence of a great number of finnings on the insulating sleeve 27 helps in supplying a leak line of a sufficiently high value to avoid electric surface discharges.

The conditions for determining this leak line are specified, for instance, in publication 815 of 1986 by International Electrotechnical Commission having title "Guide for the selection of insulators in respect of polluted conditions".

The height value "h1" of the termination together with the shape and size of the fins on casing 11 leads to the above mentioned value of the leak line.

As shown in FIG. 1, at the passage between upper and lower surfaces of flange 19 an interruption of shield 12 can be seen.

However, accomplishment of termination 1 contemplates the possibility of giving flange 19 such thickness values that the path of the electric field lines does not substantially diverge from the path that would occur in the presence of a shield at this area too, except for a slight radial swelling, qualitatively shown in FIG. 6, to which, as ascertained, no risk of an excessive value of electric gradient corresponds.

It is pointed out that in a termination up to 170 kV, having sizes as above described in the example, an appropriate thickness for flange 19 is of about 40 mm.

Figure 5:
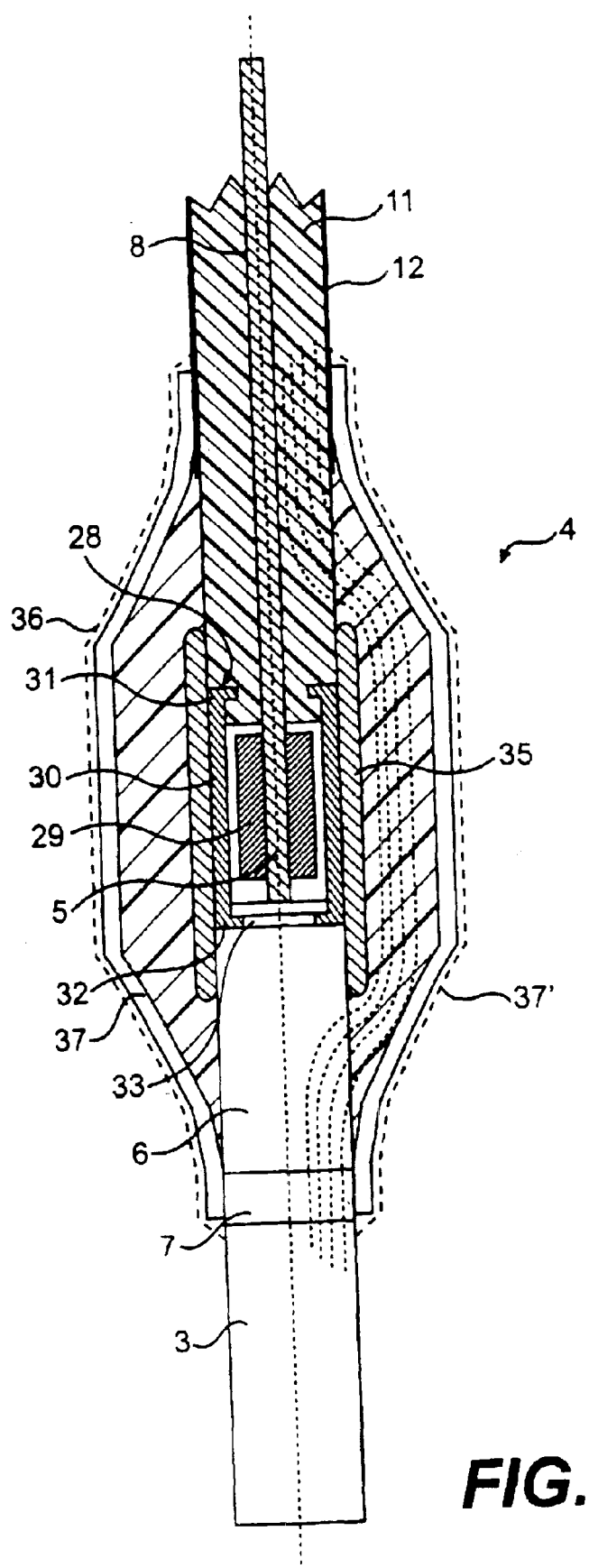
FIG. 5 shows the joint of FIG. 1 in an expanded scale.

The course of the electric-field lines at joint 4, in the presence of deflecting body 35 and the semiconductive material sheath is qualitatively shown in FIG. 5.

A correct operation of the termination depends on a variety of features, determined in accordance with the invention in the termination manufacturing process even before its mounting on supporting structure 2.

A first essential condition for correct operation of the termination is the absence of air between the different parts subjected to high electric potential differential, in particular the absence of air bubbles between conductive element 8 and insulating body 11 over their whole extension, between conductive coating 12 and insulating body 11, between deflecting cone 26 and insulating body 11, between finned casing 14 and insulating sleeve 27.

Actually, the presence of air, exposed to ionization phenomena in the presence of an electric field, would trigger electric discharges from the portion at greater potential towards that at ground potential.

A convenient result, as regards operation, has been achieved in the following manner.

The insulating body 11 is made perfectly adhering to the conductive element 8, for example by a moulding process comprising the steps of disposing the conductive element in a mould and pouring or extruding around it the material intended to form the insulating body itself, or making a winding with insulating fibres or yarns (such as fibreglass or polyaramidic fibres and the like), disposed about the conductive element and soaked with a resin, for example a thermosetting resin (polyester, epoxy resin or the like).

Adhesion of semiconductive shield 12 to a predetermined portion of the insulating body is obtained, for example, by making the shield itself through application of a semiconductive paint on the relevant portion of the outer surface of body 11.

Deflecting body 26 adheres to the conductive coating 12 because it is conveniently made of an elastomeric material and is incorporated into sleeve 27, the whole being elastically fitted on insulating body 11, in such a way that the deflecting body exerts pressure on the semiconductive coating, for example by an interference degree of at least 10% between sleeve 27 and insulating body 11.

Alternatively, sleeve 27 may be directly moulded on body 11, after arranging deflecting body 26 thereon; in this case, adhesion between elements can be promoted by interposition of an adhesive material.

Finned casing 14 is made adherent to the surface of insulating sleeve 27.

In an embodiment, finned casing 14 is applied to insulating sleeve 27 after being moulded separately, by elastic fitting of the former on the latter.

Alternatively, when the employed materials have suitable features, finned casing 14 may be an integral part of the sleeve itself, forming the outer portion of same; the finned profile may be made either by moulding or by mechanical working, i.e. by chip removal, grinding, refacing and the like.

Alternatively, finned casing 14 can be moulded around insulating body 11 by adopting a finned mould, suitable to be filled, for instance, with liquid silicone; this technique allows to obtain both only the part forming the finned casing, or, optionally, the whole assembly consisting of insulating sleeve 27 and finned casing 14, which, in the last mentioned case, will form the outer portion of said sleeve.

A termination in accordance with the present invention can be advantageously submitted to a final quality control method so as to offer the customer the assurance of a perfect operation in use, without any additional check.

By way of example, it is hereinafter described a first quality control method for the termination, with reference to the embodiment shown in FIG. 2. To this purpose, the termination, constructed as previously described, is completed upon mounting it on the upper extremity of shield ring 17 and shank 16.

Figure 7:
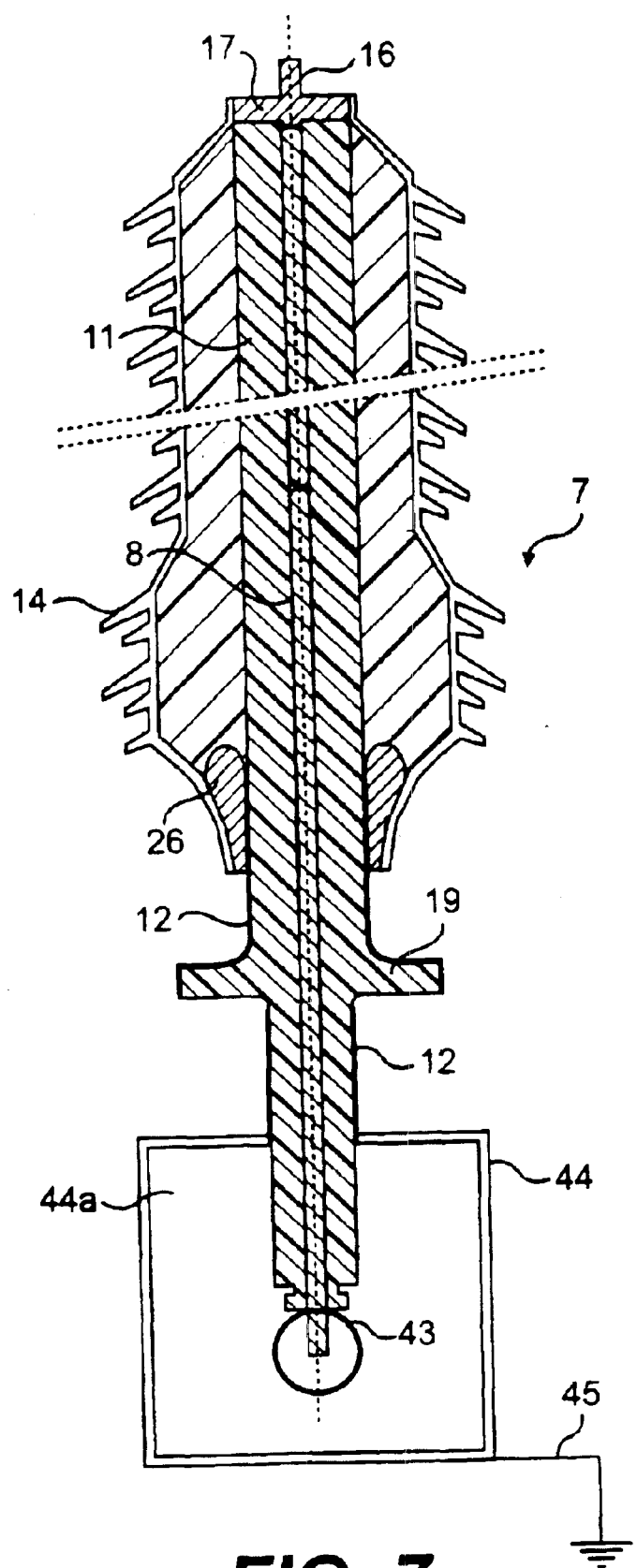
FIG. 7 is a longitudinal sectional view of a first embodiment of an apparatus for verifying the operability of the termination of FIG. 1.

As shown by test diagram of FIG. 7, the method uses a bulb 43 with a conductive surface, and a metal container 44 filled with an insulating fluid 44a.

The method comprises the steps of:

disposing the bulb 43 about the end of the conductive element 8;

introducing the end portion comprising bulb 43 into the insulating fluid within metal container 44 electrically connected to the earth and at a predetermined distance from the container walls, for test uniformity purposes;

applying a voltage of a predetermined value between shank 16 of the termination and grounding 45 of the container.

In the example, the bulb has an outer diameter of 300 mm, the bulb surfaces are at a distance of 350 mm from the side walls of container 44, the insulating fluid is a mineral oil; the test voltage corresponds to the use voltage of the termination and can be increased up to 250% of the use voltage itself.

The positive result of the test corresponds to the absence of electric discharges up to said maximum test voltage.

The above described method allows to provide the customer with an already guaranteed termination for a subsequent good operation, and also completed in all its parts and arranged for subsequent connection to the electric cable.

Figure 8:
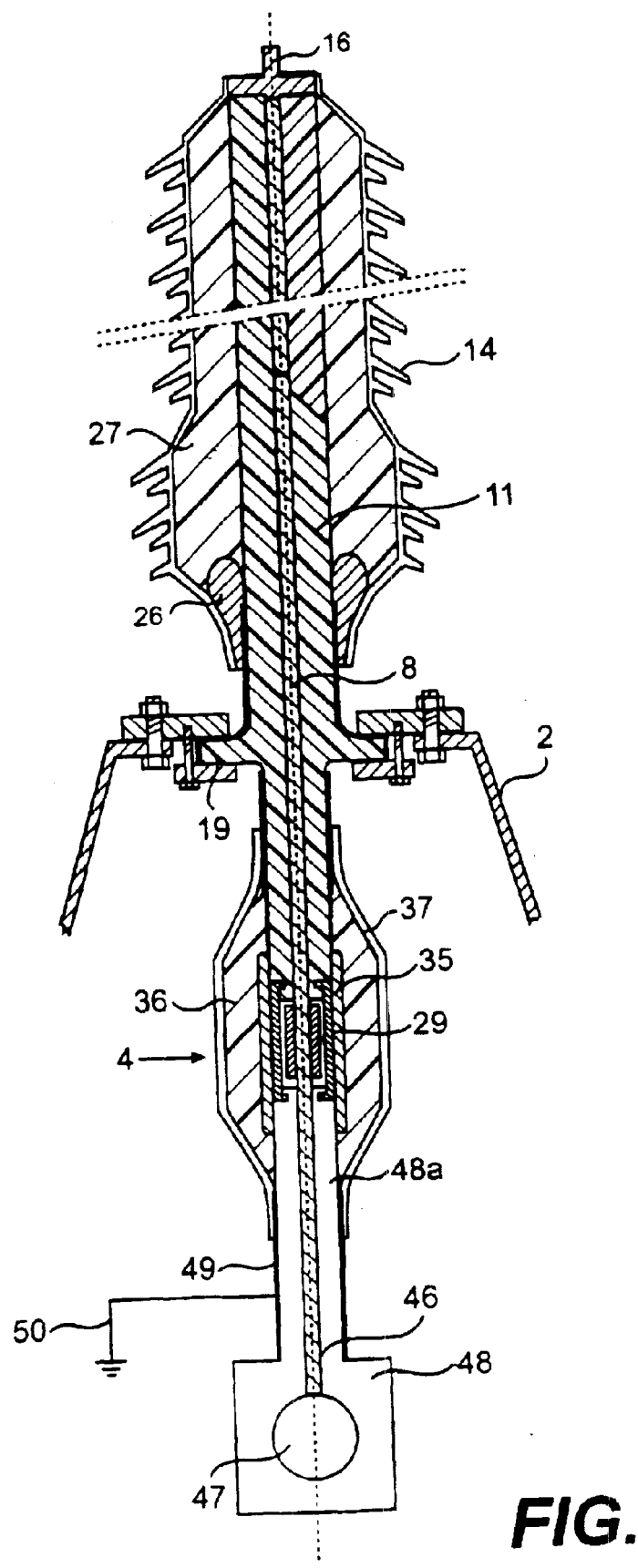
FIG. 8 is a longitudinal sectional view of another embodiment of an apparatus for checking the operability of the termination of FIG. 1.

According to an alternative method, the quality control of the termination in accordance with the invention is accomplished by a test as diagrammatically shown in FIG. 8.

To this purpose, a conductive bar 46 is arranged, which advantageously has the same diameter of conductive element 8 and of the cable conductor for which the termination is intended, provided at the lower extremity thereof with a ball 47, the whole being incorporated in an insulating resin mass 48, having an upper portion 48a of same size as the cable insulator for which the termination is intended.

The resin mass is coated with a semiconductive layer 49 at a predetermined distance from ball 47, for example a distance of about 100 mm. Therefore, the method comprises the steps of:

connecting the semiconductive layer 49 to grounding installation 50, connecting, by a terminal 29 suitable to give the electric contact, the upper extremity of conductive bar 46, projecting from the insulating upper portion 48, to conductive element 8 of the termination, applying a joint 4 over terminal 29, thereby connecting semiconductive layer 49 of resin mass 48 to conductive coating 12 on insulating body 11 of the termination;

applying a voltage between termination shank 16 and grounding installation 50.

Preferably, joint 4 of FIG. 8 is of the already described type, with reference to FIG. 5.

In accordance with this solution, description of the joint is omitted for the sake of simplicity and the different joint parts are denoted by the same reference numerals as in the previous type.

Acceptability of the termination is determined by the absence of electric discharges until the maximum voltage values and according to the modalities required by test standards.

The method allows to check good functioning both of the termination and of its connection to the joint, with advantages for the customer in particular when the joint employed in the test is prefabricated and of the same kind as provided for use in the final installation, as shown in FIG. 1.

The termination, whose functioning is guaranteed by the above described test methods, does not require during installation any further operation inside it, so that it keeps configuration of the different components and achieved features unchanged in time.

As compared with the termination described in the already mentioned patent application EP 95 101 338.2 of the Applicant itself, the termination in accordance with the invention is convenient.

Also for the termination of the above mentioned patent application a quality test may indeed be envisaged after manufacturing and before installation, by introducing a cable sample into it following known modalities, which sample will be identical with the one to be actually used for the final termination installation.

However, in this embodiment, specific mounting operations are needed to carry out the required fastening conditions of the relevant field control elements, which operations greatly affect the test result and in any event must be repeated anew when the termination has been installed.

Therefore, the test and subsequent installation steps for this known termination require repeated interventions inside the termination itself, with very delicate operations and calibrations, as well as sophisticated assembling techniques typical of operators skilled in the field of terminations.

Conversely, the termination in accordance with the present invention uses an assembly extended lengthwise over the whole termination length, formed of the conductive element. 8 and body 11, on which firstly insulating sleeve 27, wherein deflecting body 26 is incorporated, and then finned casing 14 are fitted; in this way a perfect adhesion between the various elements is achieved which is necessary to prevent air bubble incorporation. All these operations are carried out at the factory, under controlled conditions and by qualified staff, and is subsequently followed by specific test operations.

The present invention is therefore distinguished from the preceding one and also from terminations made of porcelain and provided with insulating oil as described in the prior art, not only for the above described solutions according to the invention, but also because it is not necessary to use traditional spring pressing systems which imply subsequent adjustment operation.

The termination according to the invention keeps during time adhesion obtained at the factory and hence allows connection of the termination itself to the electric cable without requiring further specific tests.

Furthermore, the termination in accordance with the invention is self-bearing in an upright position, even in the presence of transversal stresses, thereby avoiding the use of conventional self-bearing structures having an outer porcelain casing and an insulating oil in its interior, which results in advantages for the absence of explosion or fire risks in the presence of inner electric discharges.

It is to be noted in particular that, although in the preceding description the conductive element 8 has been defined as "rigid", rigidity of the whole is ensured by the assembly consisting of element 8 and body 11; therefore, if body 11 is suitable to ensure by itself the desired rigidity features to the termination, for example being made of fibre glass reinforced resin or the like, the only function required to element 8 will be that of electric conductor.

Alternatively, mechanical rigidity features can be shared, based on specific use requirements, between element 8 and body 11, and optionally other existing elements, until the desired rigidity of the assembly is achieved.

What is claimed is:

1. An outdoor termination for an electric cable, comprising:
   a conductive element longitudinally extended from a lower extremity to an upper extremity;
   a conductive shank connected to the upper extremity of the conductive element, adapted for connection of the termination to an electric installation;
   an insulating body surrounding the conductive element from near the lower extremity of the conductive element to near the upper extremity of the conductive element;
   a casing of an elastic insulating material disposed around the insulating body; and
   electrical-field control means disposed in a radially inner Position relative to the casing;
   wherein the conductive element is not part of the electric cable,
   wherein the insulating body comprises a substantially cylindrical portion surrounding the conductive element near the lower extremity of the conductive element,
   wherein the substantially cylindrical portion is adapted for connection of the termination to the electric cable, and
   wherein the conductive element and the insulating body constitute a substantially rigid assembly adapted to resist a predetermined transverse stress.

2. The termination of claim 1, wherein the insulating body further comprises a conductive coating extended over a predetermined length of the portion surrounding the conductive element near the lower extremity of the conductive element, and
   wherein the conductive coating constitutes an electric shield about the conductive element.

3. The termination of claim 2, wherein the conductive coating on the insulating body comprises a paint layer filled with a conductive filler.

4. The termination of claim 2, wherein the electric-field control means is in contact with the conductive coating of the insulating body.

5. The termination of claim 2, wherein the casing of insulating material incorporates a deflecting element of a semiconductive elastomeric material elastically pushed onto the insulating body, and
   wherein the deflecting element is in contact with the conductive coating of the insulating body.

6. The termination of claim 1, wherein the insulating body further comprises means adapted for connecting the termination to an outer supporting structure.

7. The termination of claim 6, wherein the connecting means comprises a flange transverse to a longitudinal axis of the termination, and
   wherein the flange includes a supporting surface for the termination.

8. The termination of claim 1, wherein the casing of insulating material comprises an outer part having a finned surface.

9. The termination of claim 8, wherein the outer part having a finned surface consists of a material having environmental resistance.

10. The termination of claim 1, wherein the casing of insulating material comprises a portion of an elastomeric material adhering to the insulating body.

11. The termination of claim 1, wherein the casing of insulating material comprises a portion of an elastomeric material elastically tightened on the insulating body.

12. The termination of claim 1, wherein the electric-field control means comprises a field-deflecting element of a semiconductive elastomeric material.

13. The termination of claim 1, wherein the insulating body incorporates a deflecting element, and
   wherein the casing is formed of a finned tube elastically and directly fitted on the insulating body.

14. A termination for an electric cable, comprising:
- a conductive element longitudinally extended from a lower extremity to an upper extremity;
- a conductive shank connected to the upper extremity of the conductive element, adapted for connection of the termination to an electric installation;
- an insulating body surrounding the conductive element from near the lower extremity of the conductive clement to near the upper extremity of the conductive element;
- an insulating sleeve disposed around the insulating body;
- a casing of an elastic insulating material disposed around the insulating sleeve; and
- electrical-field control means included in the insulating sleeve;
- wherein the conductive element is not part of the electric cable,
- wherein the insulating body comprises a substantially cylindrical portion surrounding the conductive element near the lower extremity of the conductive element,
- wherein the substantially cylindrical portion is adapted for connection of the termination to the electric cable, and
- wherein the conductive element and the insulating body constitute a substantially rigid assembly adapted to resist a predetermined transverse stress.

15. The termination of claim 14, wherein the insulating body further comprises a conductive coating extended over a predetermined length of the portion surrounding the conductive element near the lower extremity of the conductive element, and
- wherein the conductive coating constitutes an electric shield about the conductive element.

16. The termination of claim 15, wherein the conductive coating on the insulating body comprises a paint layer filled with a conductive filler.

17. The termination of claim 15, wherein the electric-field control means is in contact with the conductive coating of the insulating body.

18. The termination of claim 15, wherein the insulating sleeve incorporates a deflecting element of a semiconductive elastomeric material elastically pushed onto the insulating body, and
- wherein the deflecting element is in contact with the conductive coating of the insulating body.

19. The termination of claim 14, wherein the insulating body further comprises means adapted for connecting the termination to an outer supporting structure.

20. The termination of claim 19, wherein the connecting means comprises a flange transverse to a longitudinal axis of the termination, and
- wherein the flange includes a supporting surface for the termination.

21. The termination of claim 14, wherein the casing of insulating material comprises an outer part having a finned surface.

22. The termination of claim 21, wherein the outer part having a finned surface consists of a material having environmental resistance.

23. The termination of claim 14, wherein the electric-field control means comprises a field-deflecting element of a semiconductive elastomeric material.

24. An outdoor termination for an electric cable, comprising:
- a conductive element longitudinally extended from a lower extremity to an upper extremity;
- a conductive shank connected to the upper extremity of the conductive element, adapted for connection of the termination to an electric installation;
- an insulating body surrounding the conductive element from near the lower extremity of the conductive element to near the upper extremity of the conductive element;
- an insulating sleeve disposed around the insulating body; and
- electrical-field control means included in the insulating sleeve;
- wherein the conductive element is not part of the electric cable,
- wherein the insulating body comprises a substantially cylindrical portion surrounding the conductive element near the lower extremity of the conductive element,
- wherein the substantially cylindrical portion is adapted for connection of the termination to the electric cable,
- wherein the insulating sleeve comprises an outer part having a finned surface, and
- wherein the conductive element and the insulating body constitute a substantially rigid assembly adapted to resist a predetermined transverse stress.

25. The termination of claim 24, wherein the insulating body further comprises a conductive coating extended over a predetermined length of the portion surrounding the conductive element near the lower extremity of the conductive element, and
- wherein the conductive coating constitutes an electric shield about the conductive element.

26. The termination of claim 25, wherein the insulating sleeve incorporates a deflecting element of a semiconductive elastomeric material elastically pushed onto the insulating body, and
- wherein the deflecting element is in contact with the conductive coating of the insulating body.

27. The termination of claim 25, wherein the conductive coating on the insulating body comprises a paint layer filled with a conductive filler.

28. The termination of claim 25, wherein the electric-field control means is in contact with the conductive coating of the insulating body.

29. The termination of claim 24, wherein the insulating body further comprises means adapted for connecting the termination to an outer supporting structure.

30. The termination of claim 29, wherein the connecting means comprises a flange transverse to a longitudinal axis of the termination, and
- wherein the flange includes a supporting surface for the termination.

31. The termination of claim 24, wherein the outer part having a finned surface consists of a material having environmental resistance.

32. The termination of claim 24, wherein the insulating sleeve comprises a portion of an elastomeric material adhering to the insulating body.

33. The termination of claim 24, wherein the insulating sleeve comprises a portion of an elastomeric material elastically tightened on the insulating body.

34. The termination of claim 24, wherein the electric-field control means comprises a field-deflecting element of a semiconductive elastomeric material.

35. The termination of claim 24, wherein the insulating sleeve incorporates a deflecting element, and
- wherein the insulating sleeve is formed of a finned tube elastically and directly fitted on the insulating body.

36. A method of manufacturing an outdoor termination for an electric cable, comprising:
- arranging a conductive element linearly extended over a predetermined length, the conductive element comprising a lower extremity and an upper extremity;
- forming an insulating body around the conductive element, from near the lower extremity to near the upper extremity, so that the conductive element and the insulating body constitute a substantially rigid assembly adapted to resist a predetermined transverse stress;
- externally applying a conductive coating over a predetermined length of the insulating body corresponding to the lower extremity of the conductive element;
- applying electric-field control means in electrical contact with the conductive coating; and
- disposing a casing of an elastic insulating material on the insulating body in an area extending from the electric-field control means to the upper extremity of the conductive element;
- wherein the conductive element is not part of the electric cable.

37. A method of manufacturing a termination for an electric cable, comprising:
- arranging a conductive element linearly extended over a predetermined length, the conductive element comprising a lower extremity and an upper extremity;
- forming an insulating body around the conductive element, from near the lower extremity to near the upper extremity, so that the conductive element and the insulating body constitute a substantially rigid assembly adapted to resist a predetermined transverse stress;
- externally applying a conductive coating over a predetermined length of the insulating body corresponding to the lower extremity of the conductive element;
- applying electric-field control means in electrical contact with the conductive coating;
- disposing an insulating sleeve around the insulating body; and
- disposing a casing of an elastic insulating material on the insulating sleeve in an area extending from the electric-field control means to the upper extremity of the conductive element;
- wherein the conductive element is not part of the electric cable.

38. A method of manufacturing an outdoor termination for an electric cable, comprising:
- arranging a conductive element linearly extended over a predetermined length, the conductive element comprising a lower extremity and an upper extremity;
- forming an insulating body around the conductive element, from near the lower extremity to near the upper extremity, so that the conductive element and the insulating body constitute a substantially rigid assembly adapted to resist a predetermined transverse stress;
- externally applying a conductive coating over a predetermined length of the insulating body corresponding to the lower extremity of the conductive element;
- applying electric-field control means in electrical contact with the conductive coating; and
- disposing an insulating sleeve around the insulating body in an area extending from the electric-field control means to the upper extremity of the conductive element;
- wherein the insulating sleeve comprises an outer part having a finned surface, and
- wherein the conductive element is not part of the electric cable.

39. A termination for an electric cable, comprising:
- a conductive element longitudinally extended from a lower extremity to an upper extremity;
- a conductive shank connected to the upper extremity of the conductive element, adapted for connection of the termination to an electric installation;
- an insulating body surrounding the conductive element from near the lower extremity of the conductive element to near the upper extremity of the conductive element;
- a casing of an elastic insulating material disposed around the insulating body; and
- electrical-field control means disposed in a radially inner position relative to the casing;
- wherein the conductive element is not part of the electric cable,
- wherein the insulating body comprises a substantially cylindrical portion surrounding the conductive element near the lower extremity of the conductive element,
- wherein the substantially cylindrical portion is adapted for connection of the termination to the electric cable,
- wherein the conductive element and the insulating body constitute a substantially rigid assembly adapted to resist a predetermined transverse stress,
- wherein the insulating body further comprises a conductive coating extended over a predetermined length of the portion surrounding the conductive element near the lower extremity of the conductive element, and
- wherein the conductive coating constitutes an electric shield about the conductive element.

* * * * *

UNITED STATES PATENT AND TRADEMARK OFFICE
CERTIFICATE OF CORRECTION

PATENT NO. : 6,818,828 B2
DATED : November 16, 2004
INVENTOR(S) : Dario Quaggia

It is certified that error appears in the above-identified patent and that said Letters Patent is hereby corrected as shown below:

Column 16,
Line 8, "Position" should read -- position --.

Column 17,
Lines 8-9, "clement" should read -- element --.

Signed and Sealed this

Seventh Day of June, 2005

JON W. DUDAS
*Director of the United States Patent and Trademark Office*